May 9, 1967  C. THOMSON  3,318,440
SOLIDS HANDLING EQUIPMENT
Filed July 23, 1965  4 Sheets-Sheet 2
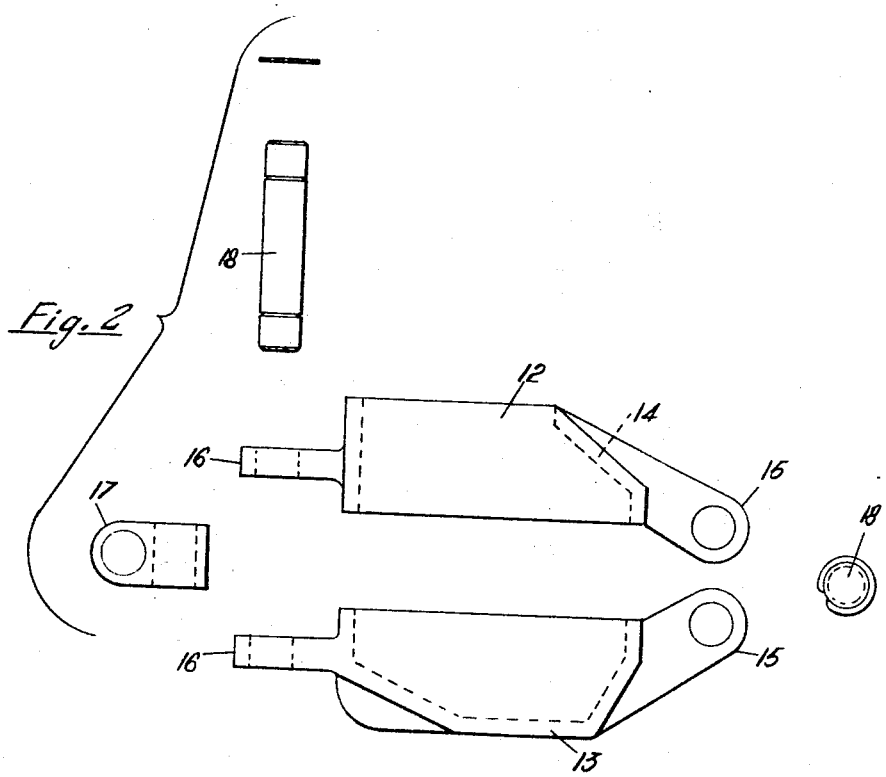
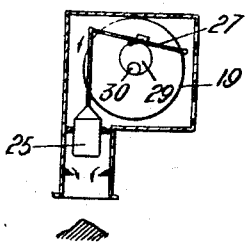
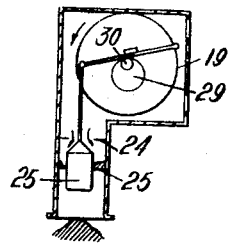
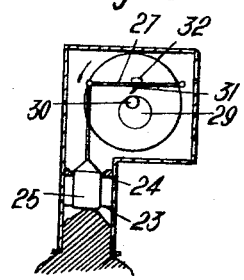
Inventor
Charles Thomson
By
Stevens, Davis, Miller & Mosher
Attorneys May 9, 1967  C. THOMSON  3,318,440
SOLIDS HANDLING EQUIPMENT
Filed July 23, 1965  4 Sheets-Sheet 3
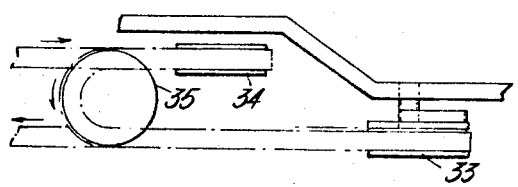
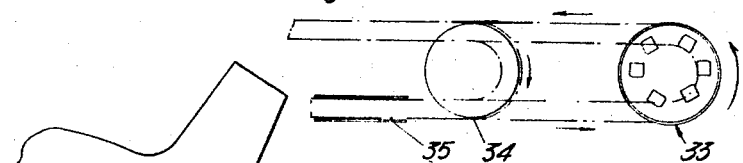
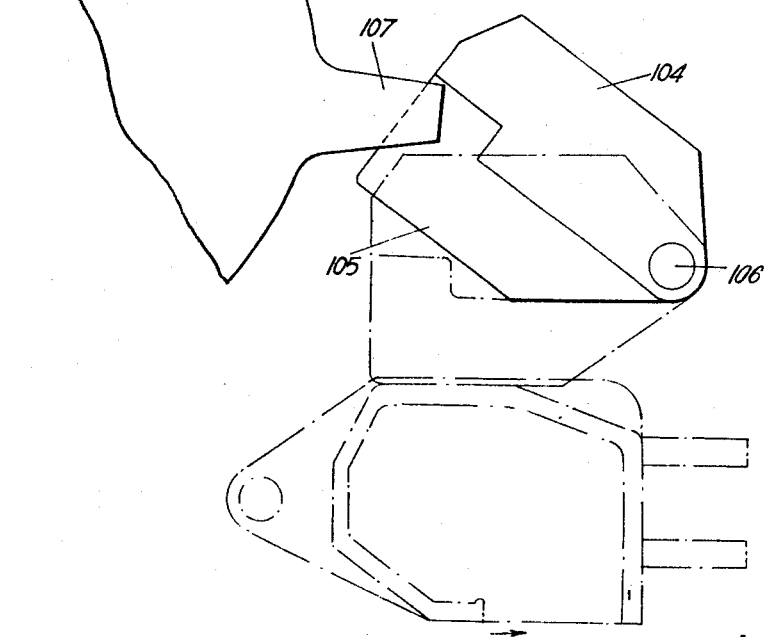
Inventor
Charles Thomson
By
Stevens, Davis, Miller & Mosher
Attorneys

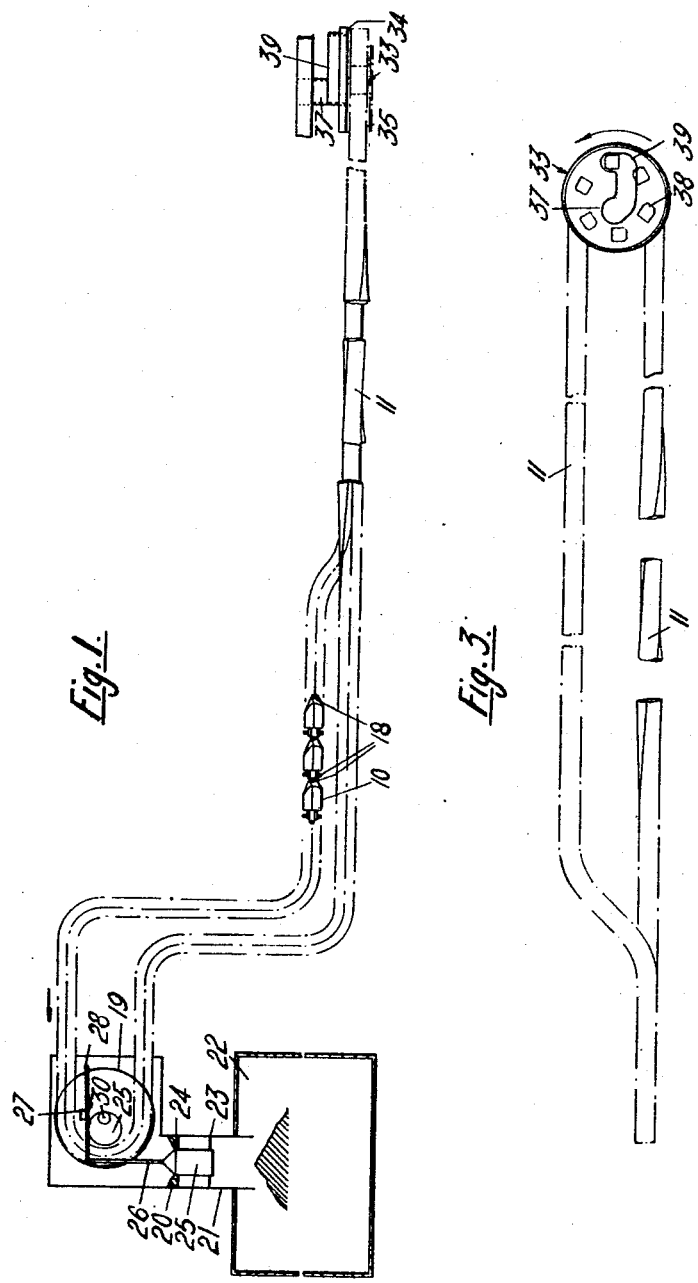

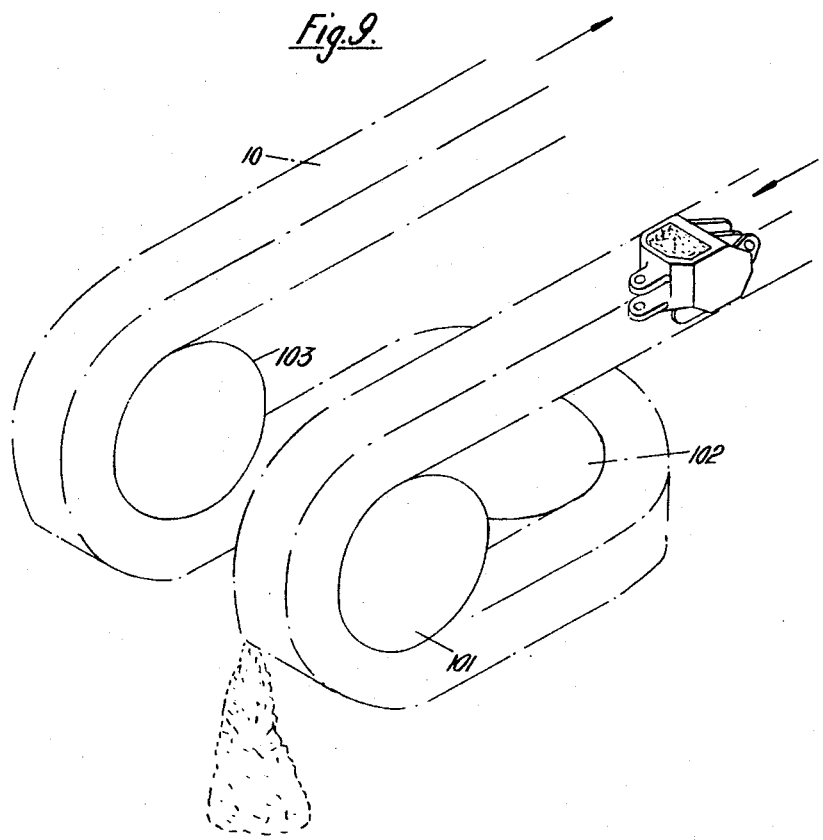

United States Patent Office 3,318,440
Patented May 9, 1967

3,318,440
SOLIDS HANDLING EQUIPMENT
Charles Thomson, Esher, England, assignor to Solar Thomson Engineering Company Limited, Surrey, England
Filed July 23, 1965, Ser. No. 474,286
Claims priority, application Great Britain, Oct. 2, 1964, 40,265/64
11 Claims. (Cl. 198—140)

This invention is concerned with solids handling equipment and particularly, but not exclusively, with equipment for handling solids in granular or small lump form, e.g. coal in an automatic domestic heating system.

According to the present invention, there is provided a conveyor comprising a chain of buckets, each bucket being connected to the next by means which permit relative angular movement of adjacent buckets in directions at right angles. In a preferred form of the invention, the bucket chain passes through a guide tube. Preferably, each connecting means comprises a coupling to which the adjacent buckets are pivoted on axes lying in planes extending at right angles to each other through the longitudinal axis of the coupling. Preferably, the buckets are pivoted to the couplings by pins which do not project beyond the boundaries of its chain cross-section. Thereby, the pivotal interconnections between the buckets cannot foul the inside of said guide tube.

Since each bucket may be required to carry the solids in both horizontal and vertical directions, it is desirable that it is provided with an inturned retaining lip. The bucket may be moulded or cast from plastic or other material. In that case, rather than employ a complicated mould as a result of the provision of the retaining lip, it is preferred to make the bucket in two parts, thereby facilitating casting or moulding. Preferably, the parts of the buckets are connected together by pivot pins forming part of said connecting means. The necessity for separate fastening means for connecting the bucket parts together is thus obviated.

The conveyor can, therefore, follow a devious path and will convey horizontally, vertically upwards, downwards at an angle determined by the form of said lip and at intermediate angles, and will negotiate vertical and horizontal bends.

A chain wheel for use with the chain of buckets with non-projecting pivot pins preferably comprises parallel side plates having inwardly-projecting pin-engagement members (suitably in the form of half-bushes) for engaging with the pivot pins. This arrangement is particularly useful at the feed end of the conveyor since its permits of the provision of feed apertures in one of the side plates immediately above the holes in the buckets so that, as the chain passes round the chain wheel, the hole in each bucket is automatically lined up with the hole in the feed plate and spillage is minimised.

The arrangement of the conveyor may suitably be such that the buckets are in an inverted position only at the discharge point.

A hammer operated by movement of a chain wheel may be provided for rapping inverted buckets at the discharge point.

The following is a description, by way of example, of one form of system embodying the above mentioned features of the present invention. Reference is made to the accompanying schematic drawings, in which:

FIG. 1 is a side view of the system;
FIG. 2 is an exploded side view of a bucket as used in the system;
FIG. 3 is a plan view of part of the system;
FIGS. 4, 5 and 6 are side views of the discharge end of the system at different stages of operation;
FIG. 7 is a side view of an arrangement for inverting the bucket assembly;
FIG. 8 is a plan view of the arrangement of FIG. 7;
FIG. 9 is a perspective view of an alternative arrangement at the discharge end of the conveyor; and
FIG. 10 is a side view of a hammer arrangement.

The system shown in the drawings comprises an endless bucket-conveyor 10 for transporting very small anthracite (under ⅛ inch) from a fuel storage bunker to a hopper feed boiler. The bucket-conveyor 10 runs through a smooth flexible guide-tube 11 made of a plastics material, and this tube can be secured as required along walls or other supports. Each bucket of the conveyor 10 is moulded from plastics in two parts 12 and 13, the upper part 12 having an overhanging lip 14. The parts 12 and 13 have co-operating lugs 15 and co-operating lugs 16 (each part having two lugs 15 and one lug 16), at their trailing and leading ends respectively with holes which register with one another when the two parts are brought together to form the bucket. The axes of the holes in the lugs 15 extend at right angles relative to the holes in the lugs 16. Coupling pieces 17 fit between the co-operating lugs and have two holes registering with the holes in the lugs. Pivot pins 18 are passed through and retained by circlips in the registering holes in the lugs and coupling pieces and serve to hold the parts 12 and 13 together and to establish a pivotal connection between each bucket and the two adjacent coupling pieces. Thus, the chain can deflect sideways or upwards as necessary.

At the delivery end of the system, the conveyor passes round a discharge pulley 19, where the anthracite falls from the buckets into a well 20. A passage 21 leads from the well 20 into the top of the hopper 22 of the boiler. In this passage are disposed two vertically-spaced rubber seals 23 and 24 having central holes adapted to be closed by a vertically-reciprocable feed plunger 25. The spacing of the seals is less than the length of the plunger. The plunger is carried by a rod 26 pivoted at its top to a horizontally extending arm 27 which is in turn pivoted at 28 to a fixed support and which, under the weight of the plunger, bears down on a cam 29 keyed to the drive shaft 30 for the pulley 19. Thus, rotation of the pulley 19 is accompanied by vertical reciprocation of the plunger. FIG. 1 shows the plunger in an intermediate position closing both seals. FIG. 4 shows the plunger in its upper position, closing the seal 24 but permitting discharge of anthracite from the feed chamber between the seals through the seal 23. FIG. 5 shows the plunger in its lower position, closing the seal 23 but permitting entry of anthracite into the feed chamber through the seal 24. FIG. 6 shows the plunger being prevented from moving into its lower position by anthracite which has filled the hopper 22. The cam 29 has moved clear of the arm 27 and freed the spring-loaded operating lever 31 of a microswitch 32 to move so as to switch off the conveyor drive motor.

Before the bucket-chain returns from the discharge wheel to the feeding mechanism 33 at the other end of the system, it is necessary to turn the buckets through 180° so that they are ready to receive more anthracite. If the chain is sufficiently flexible, this turning can be done simply by twisting the guide tube. If the chain is not sufficiently flexible for this to be done, it is necessary to provide additional guide wheels to effect turn-over, e.g. guide wheels 34 and 35 as shown in FIGS. 7 and 8.

At the feed mechanism 33, the buckets pass around a chain wheel rotatable on a vertical axis and having two side plates 34 and 35 each with inwardly-projecting half bushes which engage with the ends of the pivot pins 18 of the buckets, which pins project beyond the lugs 15 and 16 but not beyond the boundaries of the chain (i.e. not beyond the bodies of the buckets). The upper side plate 34 has an upstanding peripheral wall and a number of apertures 38 of the same shape and size as the top openings of the buckets and so arranged relative to the half bushes as to register with those openings as the buckets pass round the chain wheel. Disposed above the feed plate 34 is a fixed anthracite supply duct 37 which is displaced from the axis of rotation of the chain wheel. The lower portion of the duct 37 is open at the bottom and has a lateral extension 39 (also open at the bottom) of a generally arcuate shape in plan which progressively overlaps the path of movement of the apertures 38. The rotary movement of the plate 34 thereby draws anthracite round from the duct 37 into the extension 39 so that it can pass through the apertures 38 into the buckets.

The feed mechanism 33 and the hopper feed arrangement including the plunger 25 are the subject of our co-pending applications and, per se, form no part of the present invention. Other arrangements could be used for the same purposes.

FIG. 9 shows an alternative discharge and arrangement in which the conveyor passes in the direction of the arrows down round a chain wheel 101 rotating in a vertical plane, around a chain wheel 102 rotating in a horizontal plane and up round a chain wheel 103 rotating in a vertical plane. Thus, the buckets require to be inverted only at the discharge end of the conveyor and can remain upright over the remainder of the conveyor. In this way, any residue remaining in the buckets remains therein without being discharged along the run of the conveyor.

FIG. 10 shows a hammer having a rigid part 104 and a resilient (e.g. rubber) part 105. The hammer is pivotally mounted at 106 at the discharge end of the conveyor and is arranged to be lifted up by teeth 107 on a chain wheel of the conveyor and allowed to swing down so that the resilient part 105 strikes inverted buckets and assists in removal of any dust or adhering matter.

The conveyor may be driven by any suitable form of drive motor through a chain wheel of the conveyor.

I claim:

1. A conveyor comprising a plurality of buckets, each bucket comprising two complementary parts, a coupling member disposed between each pair of adjacent buckets, and two pivot pins connecting said parts and pivotally connecting each coupling member with its two adjacent buckets to form a bucket chain, said pins lying wholly within the lateral boundaries of the buckets, and having axes lying in planes at right angles to each other.

2. A conveyor according to claim 1, wherein a guide tube is provided through which said buckets pass.

3. A conveyor according to claim 1, wherein each bucket has a retaining lip inturned in a direction lengthwise of the bucket chain.

4. A conveyor according to claim 1, wherein said bucket parts have pairs of cooperating lugs through which said pivot pins pass, said coupling members being located between the lugs.

5. A conveyor according to claim 1, wherein at least one chain wheel is provided around which the bucket chain passes, said chain wheel comprising parallel side members and inwardly projecting pin-engagement members carried by the side members, which pin-engagement members drivingly engage ends of said pivot pins.

6. A conveyor according to claim 5, wherein said chain wheel is disposed adjacent a discharge location where the buckets are inverted, teeth are provided on said chain wheel, and a pivoted hammer is provided engageable by said teeth to cause the hammer to rap inverted buckets.

7. A conveyor according to claim 5, wherein said chain wheel is arranged to rotate on a vertical axis and feed apertures are provided in the uppermost side member of the chain wheel for registering with the tops of the buckets.

8. A conveyor according to claim 1, wherein turnover means are provided for rotating the chain about its axis through 180° at at least one desired position in the length thereof without twisting the chain, and said turn-over means comprising a plurality of said chain wheels rotatable in two planes at right angles.

9. A conveyor according to claim 1, wherein a discharge arrangement comprising a first chain wheel rotatable in a vertical plane and around which the bucket chain moves downwardly to invert the buckets for discharge of their contents, a second chain wheel rotatable in a horizontal plane and around which the inverted buckets move from said first wheel, and a third chain wheel rotatable in a vertical plane and around which the bucket chain from said second wheel moves upwardly to return the buckets to their original attitude.

10. A conveyor comprising a plurality of buckets, each bucket comprising two complementary parts having cooperating lugs with registering holes, a coupling member disposed between each pair of adjacent buckets and located between pairs of said lugs, said coupling members having holes registering with the holes in the lugs, and two pivot pins engaging in said holes to connect said parts and to pivotally connect each coupling member with its two adjacent buckets to form a bucket chain, said pins having axes lying in planes at right angles to each other and having projecting ends, said coupling members and pins lying wholly within the lateral boundaries of the buckets.

11. A bucket for a conveyor, said bucket comprising a top part having two open ends, a bottom part complementary to said top part and having one open end, an inturned retaining lip formed on said top part, and at least one lug formed on opposite ends of said parts, said lugs having registering holes adapted to receive pivot pins for connecting said parts together, the holes of the lugs at one end of said connected parts extending in a plane at a right angle to the holes of the lugs at the other end of said connected parts, the holes of said lugs being adapted to align with holes of lugs of similar buckets to permit connection between said buckets to form a bucket chain.

References Cited by the Examiner

UNITED STATES PATENTS

| | | | |
|---|---|---|---|
| 542,682 | 7/1895 | Moore | 198—129 |
| 1,090,966 | 3/1914 | Berghoefer | 198—140 X |
| 1,155,670 | 10/1915 | McGregor | 198—141 X |
| 1,558,490 | 10/1925 | Mayberry | 198—152 |
| 1,769,336 | 7/1930 | Detaint et al. | 198—152 X |

FOREIGN PATENTS 1,208,798  9/1959  France.

EVON C. BLUNK, *Primary Examiner.*

R. J. HICKEY, *Assistant Examiner.*